United States Patent
Krüger

(10) Patent No.: US 9,801,403 B2
(45) Date of Patent: Oct. 31, 2017

(54) SWEETENER COMPOSITIONS

(75) Inventor: Willibert Krüger, Bergisch Gladbach (DE)

(73) Assignee: Kruger GmbH & Co. KG, Bergisch Gladbach (DE)

(*) Notice: Subject to any disclaimer, the term of this patent is extended or adjusted under 35 U.S.C. 154(b) by 497 days.

(21) Appl. No.: 13/580,001

(22) PCT Filed: Nov. 16, 2010

(86) PCT No.: PCT/EP2010/006953
§ 371 (c)(1), (2), (4) Date: Nov. 28, 2012

(87) PCT Pub. No.: WO2011/101002
PCT Pub. Date: Aug. 25, 2011

(65) Prior Publication Data
US 2013/0209643 A1   Aug. 15, 2013

(30) Foreign Application Priority Data

Feb. 19, 2010 (DE) .......... 10 2010 008 707
Jun. 28, 2010 (DE) .......... 10 2010 025 323

(51) Int. Cl.
| A23L 1/236 | (2006.01) |
|---|---|
| A23L 2/52 | (2006.01) |
| A23L 2/60 | (2006.01) |
| A23L 29/30 | (2016.01) |
| A23L 27/30 | (2016.01) |
| A23L 33/105 | (2016.01) |

(52) U.S. Cl.
CPC ............. *A23L 1/2363* (2013.01); *A23L 2/52* (2013.01); *A23L 2/60* (2013.01); *A23L 27/30* (2016.08); *A23L 27/33* (2016.08); *A23L 27/36* (2016.08); *A23L 27/37* (2016.08); *A23L 29/35* (2016.08); *A23L 33/105* (2016.08)

(58) Field of Classification Search
None
See application file for complete search history.

(56) References Cited

U.S. PATENT DOCUMENTS

| 2002/0192355 | A1 | 12/2002 | Serpelloni | |
|---|---|---|---|---|
| 2005/0244568 | A1* | 11/2005 | Gokhan | A23L 1/0029 426/658 |
| 2006/0112956 | A1* | 6/2006 | Serpelloni | A23L 1/0017 127/34 |
| 2006/0246197 | A1* | 11/2006 | Kshirsagar | A23L 1/2367 426/548 |
| 2007/0082104 | A1* | 4/2007 | De Baets | A21D 2/16 426/548 |
| 2007/0298152 | A1* | 12/2007 | De Baets | 426/548 |
| 2008/0069935 | A1 | 3/2008 | Ison | |
| 2008/0292766 | A1* | 11/2008 | Hoffman | A21D 2/18 426/548 |
| 2008/0292775 | A1* | 11/2008 | Prakash | A23L 27/36 426/658 |
| 2008/0311265 | A1 | 12/2008 | Macdonald | |
| 2009/0110797 | A1 | 4/2009 | Gottemoller | |
| 2009/0324793 | A1 | 12/2009 | Zheng | |

FOREIGN PATENT DOCUMENTS

| CN | 101124960 | 2/2008 |
|---|---|---|
| CN | 101124980 | 2/2008 |
| CN | 101606680 | 12/2009 |
| DE | 102005024183 | 12/2005 |
| EP | 0530111 B1 * | 3/1993 |
| EP | 1652436 | 5/2006 |
| EP | 1817964 | 8/2007 |
| EP | 2177111 | 4/2010 |
| JP | 2000037169 | 2/2000 |
| JP | 2004113146 | 4/2004 |
| JP | 2006314240 | 11/2006 |
| WO | 9745025 | 12/1997 |
| WO | 9842206 | 10/1998 |
| WO | 2006015880 | 2/2006 |
| WO | 2006137079 | 12/2006 |
| WO | 2007061810 | 5/2007 |
| WO | 2011017443 | 2/2011 |

* cited by examiner

*Primary Examiner* — Tamra L Dicus
(74) *Attorney, Agent, or Firm* — Edward E. Sowers; Brannon Sowers & Cracraft PC

(57) ABSTRACT

The invention relates to a sweetener composition, in particular having a reduced physiological calorific value (energy content), preferably for sweetening food, wherein the sweetener composition contains a combination of at least one sweetener and at least one water-soluble, bulk substance, and to the use of said sweetener composition.

6 Claims, No Drawings

SWEETENER COMPOSITIONS

CROSS-REFERENCES TO RELATED APPLICATIONS

This application is a National Stage filing of International Application PCT/EP 2010/006953, filed Nov. 16, 2010, claiming priority to German Applications No. DE 10 2010 008 707.6 filed Feb. 19, 2010, and DE 10 2010 025 323.5 filed Jun. 28, 2010, entitled "NOVEL SWEETENER COMPOSITIONS." The subject application claims priority to PCT/EP 2010/006953, and to German Applications No. DE 10 2010 008 707.6, and DE 10 2010 025 323.5 and incorporates all by reference herein, in their entirety.

BACKGROUND OF THE INVENTION

The present invention relates to the field of food technology, in particular sweetener compositions, or compositions having a reduced physiological calorific value (energy content) for sweetening foods.

In particular, the present invention relates to a sweetener composition, in particular having a reduced physiological calorific value (energy content) that can preferably be used for sweetening foods.

In addition, the present invention relates to the use according to the invention of the sweetener composition according to the invention.

Nutrition plays an important role with respect to maintenance of health and feeling of wellbeing of the human body. In particular, in industrialized countries, the nutritional habits with respect to balanced and healthy nutrition are frequently not optimal. In particular, frequently, foods are consumed which have an excessive fat content and also a very high sugar content. Also, cereal products that are low in dietary fiber, in particular those based on wheat flour, are consumed in excess. This dietary habit that is typical in particular of industrialized countries leads to an increasing displacement of foods having a high dietary fiber content, and so the beneficial action of a diet rich in dietary fiber is absent in current nutritional habits.

As a consequence of this unbalanced nutrition, frequently certain syndromes occur, such as caries, constipation, diverticulitis, diabetes, cardiovascular diseases and also tumor disorders, such as large bowel cancer. With respect to the abovementioned diseases, frequently also there can be a relationship with an insufficient intake of dietary fibers, which can cause or sometimes reinforce the abovementioned diseases. A change in nutritional habits towards a whole food diet rich in dietary fiber frequently leads to an improvement of the diseases in question or prevents them appearing at all. Against this background, an adequate intake of dietary fibers therefore assumes an important role with respect to the maintenance of health of the human body.

With respect to the beneficial properties of dietary fibers, in addition, it is assumed that owing to a diet rich in dietary fibers, the risk of suffering coronary heart disease can be decreased, in particular in the context that dietary fibers lead to an increased secretion of bile acids and in addition have a cholesterol-lowering effect. Likewise, it is considered to be certain that a diet rich in dietary fiber can be used for treatment of diverticulitis.

Generally, dietary fibers are substantially indigestible food components which cannot be cleaved by human digestive secretions into fragments that are utilizable by the body and therefore are not utilizable by the digestive system as nutrients. Generally, dietary fibers can also be subdivided on the basis of their physical properties: thus, firstly there are water-insoluble dietary fibers which are generally able to bind water thereto, and so in this manner, for example, stool volume is increased, accompanied by a stimulation of intestinal movement, which can counteract constipation, for example. In addition, there are what are termed water-soluble dietary fibers which are generally soluble in water. Such water-soluble dietary fibers can, in addition, in particular in the large intestine, be fermented at least in part by the microorganisms present there and, inter alia, be converted into short-chain fatty acids, which are substantially resorbed by large bowel mucosa, and can serve for the nutrition of mucosal cells, which can equally have a beneficial effect on health.

On the basis of the beneficial properties of dietary fibers, together with the accompanying prevention of diseases, the German Nutrition Society recommends a daily consumption of at least 30 g of dietary fibers. However, owing to modern diets, which, in particular, are directed towards the consumption of industrially preprepared foods, this is not always ensured.

Furthermore, diets in industrial countries are also frequently directed towards the consumption of sometimes highly sweetened foods. Against the background of a constantly increasing requirement for healthy and, in particular, calorie-conscious nutrition, in the prior art, reduced-calorie products are used as alternative sweeteners to classical crystalline sugar (i.e. sucrose). These can be used, for example, in the form of what are called loose sweeteners or table sweeteners, and also in the form of compactates or tablets or else in the form of aqueous compositions or liquid sweeteners.

Such sweeteners of the prior art, which are widespread, completely exclude the aspect of providing further components having a beneficial effect on health, in particular with respect to the abovementioned dietary fibers. In addition, on the basis of the sweeteners known in the prior art, it is not possible to adjust or tailor the organoleptic properties of the foods that are to be sweetened in a specific manner, for example which concerns viscosity or creaminess or the like of, in particular, liquid foods, for example based on drinks.

A further disadvantage of the sweeteners known in the prior art is, in addition, frequently considered to be that, owing to the special composition and sometimes exclusive use of sweeteners, they are difficult to meter as such with respect to sweetening power and, in addition, frequently have an unnatural or artificial sweet taste. Therefore, the sensory properties of the sweeteners known in the prior art are sometimes not optimal.

BRIEF SUMMARY OF THE INVENTION

Proceeding from the prior art, the object of the present invention therefore is to provide special sweetener compositions which prevent or at least reduce the above-described disadvantages of the sweeteners known in the prior art.

A further object of the present invention is to provide an improved sweetener composition which possesses further health-promoting properties and which therefore is nutritionally improved compared with the compositions of the prior art.

In addition, a further object of the present invention is to provide an improved sweetener composition which possesses improved organoleptic properties and on the basis of same the organoleptic properties of the foods that are to be sweetened can be specifically adjusted or tailored. In this case, the sweetener composition according to the invention in addition should have a naturally tasting sweetness.

For solution of the above-described object, the present invention proposes a sweetener composition (i.e. a sweetener having, in particular, a reduced physiological calorific value or energy content) as disclosed herein; further advantageous embodiments are similarly disclosed.

Finally, the present invention relates to the use of the sweetener composition according to the present invention. Of course, particular designs and embodiments hereinafter which are only described in connection with one aspect of the invention also apply correspondingly with respect to the other aspects of the invention, without this requiring an explicit mention.

In all of the relative or percentage quantities, in particular weight-related quantities, stated hereinafter, in addition it must be noted that in the context of the present invention these must be selected by those skilled in the art in such a manner that the sum—optionally with inclusion of further components or ingredients or additives or constituents, in particular as defined hereinafter—always results in 100%. However, this is obvious to those skilled in the art.

Furthermore, those skilled in the art can deviate from the quantities listed hereinafter in a manner related to application or due to individual cases, without leaving the context of the present invention.

The applicant has, completely surprisingly, discovered that the object of the invention can be solved by a special sweetener composition which is present, for example, in the form of a loose sweetener, in the form of compactates or tablets, or as a liquid sweetener, wherein the sweetener composition according to the invention can be used preferably for sweetening foodstuffs. In this case the sweetener composition according to the invention is based at least on one binary combination of at least one sweetener firstly, and at least one water-soluble and/or water-dispersible, preferably water-soluble, dietary fiber secondly.

DETAILED DESCRIPTION OF THE INVENTION

The present invention—according to a first aspect according to the invention—therefore relates to a sweetener composition, in particular having a reduced physiological calorific value (energy content), preferably for sweetening foodstuffs, wherein the sweetener composition contains, in combination, (a) at least one water-soluble and/or water-dispersible, preferably water-soluble dietary fiber and (b) at least one sweetener.

The concept underlying the invention is therefore to provide a sweetener composition which, firstly, comprises at least one sweetener, and, secondly, comprises at least one water-soluble or water-dispersible, preferably water-soluble dietary fiber. In this connection, in the context of the present invention it has been possible, completely unexpectedly, to provide a nutritionally markedly improved sweetener composition which, namely, firstly comprises a reduced physiological calorific value and which, secondly, by the targeted use of a special dietary fiber, comprises a marked contribution for improving the dietary fiber supply with the accompanying beneficial aspects for health.

Furthermore, the composition according to the invention, completely surprisingly, also has improved organoleptic properties, whereby, using the sweetener composition according to the invention, in particular a naturally tasting sweetness and a natural taste can be evoked. This is because—without wishing to be bound by this theory—the additional use of the dietary fiber compensates for the frequently unnatural taste of the corresponding sweeteners, and so the dietary fibers used, surprisingly, lead not only to an improved nutritional benefit, but, furthermore, also to a marked improvement in taste of the composition according to the invention, and so the sweetener, firstly, and the dietary fiber, secondly, completely surprisingly, act together synergistically.

In addition, the sweetener composition according to the invention is distinguished in that the organoleptic properties of the sweetener composition per se, or of the foods that are to be sweetened thereby, can be set in dependence on the special selection and matching of the components, in particular as concerns, e.g., the viscosity or creaminess of the corresponding foods, for example in the form of drinks—and simultaneously ensuring a naturally sweet taste.

The sweetener composition according to the invention can be provided in a multiplicity of administration forms, which markedly increases the spectrum of use, or the usability of the sweetener composition according to the invention. For instance, the composition according to the invention, which can be used or provided, for example, in the form of a loose sweetener or in the form of tablets or as liquid sweetening, can be used for sweetening liquid, pasty or solid foods.

As a result, the sweetener composition according to the invention therefore offers the possibility of a low-calorie sweetening, wherein, at the same time, valuable dietary fibers are supplied to the human body, which dietary fibers, as stated hereinbefore, not only lead to a beneficial effect on health, but also improve the properties of the sweetener composition according to the invention per se, in particular with respect to the abovementioned organoleptic and sensory properties. On account of the use of the special ingredients, the sweetener composition according to the invention, in addition, exhibits reduced cariogenicity.

A further central advantage of the present invention is that, owing to the targeted combination of dietary fibers, on the one hand, and sweeteners, on the other, the sweetener composition according to the invention has a high suitability in the context of the nutritional plan of diabetics. This is because—without wishing to be restricted to this theory—carbohydrates of dietary-fiber-rich food present in the other food are resorbed more slowly in the intestine, accompanied by a lower rise in blood sugar after consumption. In this case the present invention is focused on the targeted use of soluble and/or water-dispersible, preferably water-soluble, dietary fibers.

The sweetener composition according to the invention can thereby be used for a great spectrum of foodstuffs, including drinks or the like, wherein, in this context, an advantage is that the foodstuffs sweetened using the sweetener composition according to the invention can be eaten immediately or very soon after adding the sweetener composition according to the invention owing to the good solubility or dispersibility of the components.

In addition, it is possible, as stated hereinafter, on the basis of the water-soluble or water-dispersible dietary fibers used according to the invention to set or tailor specifically the organoleptic properties of the foods that are prepared thereby. In particular, owing to the use of water-soluble or water-dispersible dietary fibers, on consumption of the food, a good mouth feel results without any accompanying feeling of foreign matter.

As concerns the expression "dietary fiber", as used in the context of the present invention, this expression relates in particular to substances that are in particular of plant origin which are at least substantially not utilizable or digestible by human digestive secretions.

According to the invention, (a) the dietary fiber can be selected from the group of (i) dextrins; (ii) pectins; (iii) plant-based gums (plant gums), in particular gum Arabic, guar, carob bean meal and/or karaya gum; (iv) plant-based mucilages; (v) algae-based gels, in particular agar-agar, carrageenan and/or alginates; (vi) inulin; (vii) oligofructose and (viii) mixtures and/or combinations thereof. In particular, (a) the dietary fiber can be used in the form of dextrins. In addition, (a) the dietary fiber can be used in the form of inulin, in particular long-chain and/or low-sugar inulin, preferably having a dietary fiber content of 75 to 99.9% by weight, preferably 80 to 99.5% by weight, particularly preferably 85 to 99% by weight, based on the inulin. In addition, (a) the dietary fiber can be used in the form of oligofructose, preferably having a dietary fiber content of 70 to 99.9% by weight, preferably 75 to 99.5% by weight, particularly preferably 80 to 99% by weight, based on the oligofructose.

In the context of the present invention, the use of dextrins is particularly advantageous. In other words, the preferred (a) dietary fibers which are used in the context of the sweetener composition according to the invention are dextrins. Since the applicant has surprisingly discovered that, owing to the use of dextrins, which have an outstanding water solubility, in particular the organoleptic properties of the sweetener composition according to the invention are particularly beneficially affected. This is because dextrins are substantially taste-neutral, which is equally advantageous. Dextrins, which are synonymously also termed starch gum, are generally poly- and oligosaccharide mixtures which can be obtained, for example, on the basis of wheat starch or corn starch, in particular by dry heating and the action of acid. In particular, dextrins having 1,2-glycosidic bonds, 1,3-glycosidic bonds, 1,4-glycosidic bonds and/or 1,6-glycosidic bonds can be used according to the invention. For further details on dextrins, reference can be made, in particular, to Römpp Chemielexikon, 10th edition, Georg-Thieme-Verlag, Stuttgart/New York, Volume 2, 1997, page 928, headword: "Dextrins" and also to the references there, the respective content of which is incorporated by reference.

As explained hereinbefore, the organoleptic properties can be set in a targeted manner on the basis of the respective dietary fibers, for example. Thus, for example, the pectins that are usable according to the invention, and also in particular the algae-based gels, have a high swellability, which—if desired—leads to formation of a certain elevated viscosity with respect to the foods prepared using the sweetener composition according to the invention. On the other hand, however, dietary fibers can also be used which, at least substantially, do not have a tendency to gel formation, as is the case, for example, for dextrins. When such dietary fibers are used, the foodstuffs sweetened using the sweetener composition according to the invention are in particular not affected with respect to their viscosity.

As far as the amount of (a) dietary fiber in the sweetener composition according to the invention is concerned, this can vary within broad ranges. In particular, the amount of (a) dietary fiber can be at most 99.5% by weight, in particular at most 99% by weight, preferably at most 98% by weight, more preferably at most 97% by weight, particularly preferably at most 95% by weight, based on the sweetener composition. Usually, the amount of (a) dietary fiber can be 1 to 99.5% by weight, in particular 20 to 99% by weight, preferably 30 to 98% by weight, particularly preferably 40 to 97% by weight, very particularly preferably 50 to 95% by weight, based on the sweetener composition.

The amount of (a) dietary fiber can be varied or matched, in particular with respect to the administration form intended in each case of the sweetener composition according to the invention, as will be further described hereinafter. In particular, administration forms according to the invention based on loose sweeteners or tablets can have generally higher relative amounts of (a) dietary fiber than an administration form of the sweetener composition according to the invention based on a liquid sweetening.

In the context of the present invention, it is equally possible that (a) the dietary fiber comprises in particular water-dispersible fibers. The organoleptic properties can be further adjusted thereby, in particular with respect to a "fuller mouth feel" of the foods consumed which are prepared using the sweetener composition according to the invention. In this respect, equally, no foreign substance feeling is established in the mouth. The amount of fibers can vary in wide ranges in relation to the (a) dietary fiber used. For instance, (a) the dietary fiber can comprise the fibers in amounts of at most 90% by weight, in particular at most 80% by weight, preferably at most 70% by weight, more preferably at most 60% by weight, particularly preferably at most 50% by weight, based on (a) the dietary fiber. Usually, (a) the dietary fiber can comprise the fibers in amounts of 10 to 90% by weight, in particular 20 to 80% by weight, preferably 30 to 70% by weight, particularly preferably 40 to 60% by weight, based on (a) the dietary fiber. The fibers are, in particular, plant (dietary) fibers which are well known to those skilled in the art.

As far as the expression "sweetener" used in the context of the present invention is concerned, this is taken to mean generally—in contrast to sugar replacers—compounds of synthetic or natural origin which possess no or a negligible physiological calorific value, in relation to the sweetening power, for which reason, in English, they are also termed "non-nutritive sweeteners". Such sweeteners have a sweetening power many times higher than sucrose or crystalline sugar. The sweetening power of a compound is given by the dilution at which it tastes just as sweet as a sucrose solution (isosweet solution). For further details on the expression sweeteners, reference can be made, in particular, to Römpp Chemielexikon, 10th edition, Georg-Thieme-Verlag, Stuttgart/New York, Volume 5, 1998, pages 4302 to 4304, headword: "Süβstoffe" [Sweeteners] and also the literature referenced there, the respective contents of which are hereby incorporated by reference.

In the context of the present invention, (b) the sweetener can be selected from the group of acesulfame, cyclamate, glycyrrhizin, aspartame, dulcin, saccharin, rebaudioside, in particular rebaudioside A, rebaudioside C, rebaudioside D, rebaudioside E and/or rebaudioside F, preferably rebaudioside A, stevioside, naringin dihydrochalcone, monellin, neohesperidin dihydrochalcone (NHDC), sucralose, thaumatin, neotame and physiologically acceptable salts and/or derivatives thereof and also mixtures of the abovementioned substances. In this respect, (b) the sweetener can be selected, in particular, from the group of aspartame, acesulfame, saccharin, cyclamate, stevioside and sucralose, and also mixtures of the abovementioned substances. Preferably, (b) the sweetener can be selected from the group of stevioside, rebaudioside and neotame. The use of both last-mentioned groups of sweeteners is advantageous, in particular with respect to ensuring a particularly natural taste, which is set, in particular, in a targeted combination with (a) the dietary fiber, wherein in this respect, with regard to the component (a), the use of dextrin leads to particularly good results. In particular, a combination of cyclamate and saccharin is also suitable, in particular in a weight-related ratio of about 10:1.

The amount of (b) sweetener in the sweetener compositions according to the invention can also vary in wide ranges: for instance, the amount of (b) sweetener can be at most 95% by weight, in particular at most 90% by weight, preferably at most 80% by weight, more preferably at most 75% by weight, particularly preferably at most 70% by weight, based on the sweetener composition. Usually, the amount of (b) sweetener can be 0.01 to 90% by weight, in particular 0.1 to 80% by weight, preferably 1 to 75% by weight, particularly preferably 5 to 70% by weight, based on the sweetener composition. Also with regard to (b) the sweetener, the relative amount in this respect can vary in dependence on the respective administration form, in particular as will be explained hereinafter.

In addition, a composition according to the invention is particularly advantageous in which the weight ratio of (a) dietary fiber to (b) sweetener is between 50:1 and 1:2, in particular between 40:1 and 1:1, preferably between 35:1 and 2:1, more preferably between 30:1 and 5:1.

Via the special ratio of (a) dietary fiber on the one hand and (b) sweetener on the other, not only the sweetening power but also the organoleptic properties can be set appropriately.

Generally, the sweetener composition according to the invention can also contain further substances which contribute to the sweetness of the sweetener composition according to the invention. For instance, it can in general be provided that the sweetener composition according to the invention, in addition, also contains (c) sugar replacer, in particular at least one sugar alcohol, and/or (d) sugar. The sweetness can be further set thereby, in particular, synergistically together with (a) the dietary fiber, the natural taste properties of the sweetener composition according to the invention can be further set or additionally improved, wherein, in particular with respect to the sugar replacers usable according to the invention, a further additional improvement of the natural taste properties may be observed, even when these sugar replacers are added in small amounts in comparison to the activity.

The sugar alcohols usable according to the invention are generally considered to belong to what are termed the sugar replacers. The expression sugar replacers is taken to mean a collective name for substances which, instead of sucrose, can be used for sweetening foodstuffs. In contrast to the sometimes intensely tasting sweeteners, from which the expression sugar replacers is generally differentiated, sugar replacers are used technologically like sucrose, i.e. they have a "body" and a physiological calorific value ("nutritive sugar replacers"). The sweetening power corresponds in wide limits to about that of sucrose. The physiological advantage of the sugar replacers, compared with sucrose, is the insulin-independent metabolization (diabetics) and the in part reduced cariogenic activity. For some sugar replacers such as, e.g., xylitol, an anticariogenic activity is even described. The sugar replacers and the sweeteners which are different therefrom are collectively termed sweeteners. For further details on the expression sugar replacers, reference can be made, for example, to Römpp Chemielexikon, volume 6, 10th edition, Georg-Thieme-Verlag, Stuttgart/New York, 1999, pages 5098 to 5100, headword: "Zuckeraustauschstoffe" [Sugar replacers], and to Römpp Lexikon Lebensmittelchemie [Römpp's Lexikon of Food Chemistry], 9th edition, Georg-Thieme-Verlag, Stuttgart/New York, page 955, headword: "Zuckeraustauschstoffe" [Sugar replacers] and also the literature referenced there in each case, the respective contents of which are hereby incorporated by reference.

The expression sugar alcohols (polyols) counted as belonging to the sugar replacers, as is used according to the invention, is a group name for generally crystal-line, readily water-soluble polyhydroxy compounds which are formed by reducing the carbonyl function of sugars. In this case, in particular, monosaccharide sugar alcohols and disaccharide sugar alcohols are differentiated. For further details on the expression sugar alcohols, reference can be made, in particular, to Römpp Chemielexikon, 10th edition, Georg-Thieme-Verlag, Stuttgart/New York, Volume 6, 1999, page 5097, headword: "Zuckeralkohole" [Sugar alcohols] and to Römpp Lexikon Lebensmittelchemie, 9th edition, Georg-Thieme-Verlag, Stuttgart/New York, 1995, pages 1953/1954, headword: "Zuckeralkohole" [Sugar alcohols] and also to the literature referenced there in each case, the respective contents of which are hereby incorporated by reference.

In particular, the sweetener composition according to the invention can therefore additionally comprise (c) at least one sugar replacer, preferably at least one sugar alcohol. In this respect, the sugar alcohol can be selected from the group of erythritol, mannitol, xylitol, sorbitol, isomaltitol, maltitol, lactitol, galactitol and mixtures thereof, preferably erythritol. Usually, the amount of (c) sugar replacer can be 1 to 50% by weight, in particular 5 to 40% by weight, preferably 10 to 30% by weight, based on the sweetener composition.

For example, the sweetener composition according to the invention can additionally contain (d) at least one sugar. In this respect, (d) the sugar can be selected from mono- or disaccharides, in particular from the group of sucrose, mannose, maltose, dextrose, lactose, glucose, xylose, isomaltulose, trehalose and mixtures thereof, preferably lactose and/or trehalose. Usually, the amount of (d) sugar can be 1 to 30% by weight, in particular 3 to 25% by weight, preferably 5 to 20% by weight, based on the sweetener composition.

In addition, according to a further embodiment, further ingredients or additives can be present in the composition according to the invention.

For instance, the sweetener composition according to the invention can additionally comprise (e) further ingredients and/or auxiliaries. In this respect, (e) the further ingredients or auxiliaries can be selected from flavorings or flavor substances, acidulants (e.g. nitrate), dyes, vitamins, minerals, stabilizers and/or preservatives (e.g. sorbic acid or salts thereof), fillers, pressing aids, disintegrants, lubricants and/or glidants, consistency-controlling agents, thickeners and mixtures thereof.

In the context of the present invention it is possible to set appropriately the quantity of the sweetness, expressed by the sweetening power. According to a preferred embodiment of the sweetener composition according to the invention, the weight-related sweetening power of the sweetener composition corresponds to 1 to 200 times, in particular 10 to 100 times, preferably 20 to 70 times the sweetening power of sucrose. On this basis, it is possible in the context of the present invention to set the sweetener composition according to the invention in such a manner, for example, that it has, per se, a sweetening power comparable to sucrose, and so with respect to the dosage, correspondingly comparable amounts or volumes result. In addition, however, the sweetening power can also be set to be markedly greater than the sweetening power of sucrose, and so as a result, substantially lower amounts of the sweetener composition according to the invention can be used to obtain a defined sweetness.

The sweetener composition according to the invention offers, as described above, the possibility of low-calorie sweetening. According to a further embodiment, the physiological calorific value of the sweetener composition (energy content) is in the range from 0.5 to 10 kcal/g, in particular in the range from 2 to 6 kcal/g, preferably in the range from 2.5 to 3.6 kcal/g.

Further advantages of the composition according to the invention are in the ready processibility thereof to give corresponding administration forms. The processing steps in this regard are well known as such to those skilled in the art, and so no further explanations are required in this respect.

In particular, the sweetener composition can be present (i) in the form of granules and/or powder and/or in the form of agglomerates, in particular as loose sweetener; (ii) in the form of compactates, in particular as tablets and/or pills, preferably as sweetening tablets or as sweetener tablets; and/or (iii) in the form of a liquid, in particular as preferably aqueous solution and/or dispersion, preferably as liquid sweetening.

According to an embodiment preferred according to the invention, the sweetener composition according to the invention can therefore be present (i) in the form of granules and/or powder and/or in the form of agglomerates, in particular as loose sweetener.

In this context, the expression "granules" is taken to mean, in particular, arrangements of granular particles, wherein the respective granular particles can be, for example, asymmetric aggregates of powder particles. The granules or the granular particles generally do not have a harmonic or even geometric shape; the shape of a ball, a rod, a cylinder etc. is generally only obtained approximately and in outline. The surface of the individual granular particles can be generally uneven. In addition, the granular particles, in many cases, can be more or less porous. For further details on the expression granules, reference can be made, in particular, to Römpp Chemielexikon, 10th edition, Georg-Thieme-Verlag, Stuttgart/New York, Volume 2, 1997, page 1600, headword: "Granulate" [Granules], and also to the literature referenced there, the respective contents of which are hereby incorporated by reference.

If the sweetener composition according to the invention is in the form of granules and/or powder and/or in the form of agglomerates, in particular in the form of loose sweetener, it is advantageous if the sweetener composition according to the invention has a bulk density of 20 to 600 g/l, in particular 30 to 500 g/l, preferably 40 to 400 g/l, more preferably 50 to 300 g/l, particularly preferably 60 to 200 g/l, very particularly preferably 70 to 90 g/l.

Generally, the expression bulk density is taken to mean the quotient of mass and the volume occupied, which in addition to the particles also includes the interstices between the individual particles and, if additionally present, also cavities (e.g. pores) of the particles. For determining the bulk densities of powders or granules or agglomerates, reference can be made to DIN ISO 607:1984-01. The bulk density is determined, for example, by charging the composition into a measuring box, measuring beaker, measuring cylinder or the like, and establishing the weight. What is termed the vibrated density, and certainly what is termed the tamped density, are higher than the bulk density, the reciprocal of which is the bulk volume. For further details on the expression bulk density, reference can be made, in particular, to Römpp Chemielexikon, 10th edition, Georg-Thieme-Verlag, Stuttgart/New York, Volume 5, 1998, page 3990, headword: "Schüttdichte" [Bulk density].

If the sweetener composition according to the invention is present in the form of grain-type granules, the granules should have, in particular, a particle size of 0.01 to 6 mm, in particular 0.05 to 4 mm, preferably 0.075 to 2 mm, more preferably 0.1 to 1 mm, particularly preferably 0.1 to 0.5 mm.

The sweetener composition according to the invention in the form of granules or powder or in the form of agglomerates should, in addition, have a certain moisture content (residual moisture). Thus, the sweetener composition according to the invention should have a total residual moisture of 0.5 to 8% by weight, in particular 1 to 5% by weight, preferably 2 to 4% by weight, based on the sweetener composition.

Setting the moisture content or the total moisture in the granules or powder or agglomerate serves, firstly, for increasing the stability, in particular the storage stability and resistance to aging, and secondly for improving the lump-forming properties. In this connection, the expression "total residual moisture", as used in the context of the present invention, relates to the total moisture content of the composition according to the invention or of the granules and therefore comprises not only added moisture, for example in the form of water, but also moisture inherently present already in the components, such as, for example, water of crystallization or the like.

As pointed out hereinbefore, in relation to the administration of the sweetener composition according to the invention, the relative content of (a) dietary fiber and/or (b) sweetener can adopt relatively high values: for instance, the amount of (a) dietary fiber can be 50 to 99.5% by weight, in particular 70 to 99% by weight, preferably 80 to 98% by weight, particularly preferably 90 to 97% by weight, based on the sweetener composition. Equally, the amount of (b) sweetener can be 0.5 to 50% by weight, in particular 1 to 35% by weight, preferably 2 to 20% by weight, particularly preferably 3 to 10% by weight, based on the sweetener composition.

With respect to the administration of the sweetener composition according to the invention in the form of granules and/or powders and/or agglomerates, it is advantageous if (a) the dietary fibers, in particular in the form of dextrins, and/or (b) the sweeteners and, optionally, (c) sugar replacers, in particular sugar alcohols, (d) sugar and/or starch derivatives are used as granule formers. The corresponding ingredients therefore to some extent adopt a double function, which is advantageous, since, furthermore, no further granule formers are required.

Generally, the sweetener composition according to the invention in the form of granules and/or powder and/or agglomerates, in particular the loose sweetener, can be obtainable by spray drying, in particular by spray drying.

In this connection, for example for obtaining the sweetener composition according to the invention in the form of granules and/or powder and/or agglomerates, in particular in the form of loose sweetener, a process can be carried out in such a manner that the respective ingredients or components are mixed with one another and brought into solution, wherein then spray drying can be carried out, for example using conventional granulation methods. The methods in this respect are well known to those skilled in the art, and so it requires no further explanations in this context.

According to a further embodiment preferred according to the invention, the sweetener composition according to the invention can be present (ii) in the form of compactates, in particular as tablets and/or pills, preferably as sweetening tablet.

In this connection, the purely outer shape or appearance is also of importance. According to a particular embodiment, the shape of the compactates, in particular the tablets and/or pills, preferably the sweetening tablets, in the mean longest extension thereof, in particular in the mean length thereof or in the mean diameter thereof, has a dimension of 0.5 to 10 mm, in particular 1 to 8 mm, preferably 4 to 6 mm. Usually, the shape of the compactates, in particular the tablets and/or pills, preferably the sweetening tablets, in the mean greatest height thereof, in particular in the mean thickness thereof, has a dimension of 0.5 to 5 mm, in particular 1 to 4 mm, preferably 1.5 to 3 mm, more preferably 1.8 to 2.8 mm. If, for example, the compactates have the shape of cuboidal tabs, the length of the cuboid is the longest extension, and in the case of cylindrical tablets or pills, the diameter.

With regard to the absolute weight, the median weight of the individual compactates, tablets, pills or the like can in each case be 10 and 200 mg, preferably 25 and 100 mg, in particular between 40 and 80 mg, preferably between 45 to 60 mg.

As far as the sweetener composition according to the invention in the form of compactates, in particular tablets and/or pills, preferably the sweetener tablets, is further concerned, the sweetener composition can in this respect have a total residual moisture of 0.5 to 8% by weight, in particular 1 to 5% by weight, preferably 2 to 4% by weight, based on the sweetener composition.

On account of the required handlability, in addition, a certain strength (tablet strength, in particular breaking strength) of the sweetener composition in the form of compactates, in particular tablets and/or pills, preferably sweetening tablets, should be given by the invention: usually, the sweetener composition then has a strength (tablet strength), in particular breaking strength, of at least 5 newtons, in particular at least 6 newtons, preferably in the range from 5 to 100 newtons, particularly preferably 5 to 50 newtons, very particularly preferably 6 to 30 newtons.

With respect to the compactates or tablets or pills, equally, a relatively high relative content of (a) dietary fiber or (b) sweetener can be achieved: for instance, the amount of (a) dietary fiber in relation to the matter composition present in the form of compactates, in particular tablets and/or pills, preferably sweetening tablets, can be 30 to 99.5% by weight, in particular 35 to 99% by weight, preferably 40 to 98% by weight, particularly preferably 45 to 97% by weight, based on the sweetener composition. In this connection, the amount of (b) sweetener can be 20 to 90% by weight, in particular 25 to 85% by weight, preferably 30 to 80% by weight, based on the sweetener composition.

The production of the sweetener composition according to the invention in the form of compactates, in particular tablets and/or pills, preferably sweetening tablets, can be improved by the targeted use of at least one lubricant and/or glidant. In this connection, the sweetener composition can optionally additionally contain at least one lubricant and/or glidant. In this respect, the lubricant and/or glidant can be selected from amino acids, in particular α-amino acids; polyethers; fatty acids and salts or esters thereof; talcum; aromatic organic acids or salts thereof, in particular benzoic acid or benzoates; and also mixtures thereof, and can preferably be an amino acid, in particular α-amino acid, particularly preferably leucine. Usually, the amount of lubricant and/or glidant can be 0.1 to 50% by weight, in particular 1 to 30% by weight, preferably 5 to 15% by weight, particularly preferably 6 to 12% by weight, based on the sweetener composition.

Furthermore, the sweetener composition according to the invention in the form of compactates, in particular pills and/or tablets, in particular sweetening tablets, can optionally additionally contain at least one further ingredient and/or at least one further additive, in particular at least one consistency-controlling agent and/or at least one thickener. In this case the further ingredient and/or the further additive can be at least one polysaccharide or a polysaccharide mixture, preferably selected from α-1,4/α-1,6-glycosidically linked polysaccharides and/or is preferably selected from starch and starch derivatives, in particular corn starch, cellulose or cellulose derivatives, in particular sodium carboxymethylcellulose, and mixtures thereof. Usually, the amount of further ingredient and/or further additive, in particular consistency-controlling agent and/or thickener, can be 1 to 30% by weight, in particular 5 to 20% by weight, preferably 10 to 15% by weight, based on the sweetener composition.

For better dissolvability of the sweetener composition according to the invention in a food, it can optionally be provided that the sweetener composition in the form of compactates, in particular tablets and/or pills, in particular sweetening tablets, additionally contains at least one disintegrant. In this respect, the disintegrant can be an agent forming gas under the action of moisture, in particular an effervescent additive. In addition, the disintegrant can be selected from alkali metal carbonates and/or hydrogencarbonates, and/or alkaline earth metal carbonates and/or hydrogencarbonates, in particular sodium hydrogencarbonate, carboxylic acids, in particular citric acid, and hydroxycarboxylic acids, such as tartaric acid, and combinations thereof. Generally, the amount of disintegrant in this respect can be 0.1 to 20% by weight, in particular 1 to 10% by weight, preferably 2 to 5% by weight, based on the sweetener composition.

Equally, the abovementioned ingredients or additives or disintegrants can also be added to a sweetener composition which is present in the form of granules, in the form of a powder, or in the form of agglomerates.

The production of the compactates or tablets or pills is well known to those skilled in the art, so that it requires no further explanation in this respect. In particular, the respective ingredients can be converted into the respective compactates by compression, in particular in the form of a mixture. According to an embodiment according to the invention, the compacting can proceed under pressure. Those skilled in the art carry out the compacting or compression under pressure in a manner known to them per se. Advantageously, the compacting, in particular compression, proceeds under ambient or standard conditions (i.e. ambient temperature, in particular 20 to 35° C.), wherein in the context of the compacting and/or compression, a heating induced by the compacting operation can take place.

Finally, the composition according to the invention can also be present (iii) in the form of a liquid, in particular as preferably aqueous solution and/or dispersion, preferably as liquid sweetening.

In this connection, the sweetener composition can contain water as solvent and/or dispersant.

Owing to the outstanding solubility of the respective components, the sweetener composition according to the invention in the form of a liquid sweetening can additionally comprise a high solids fraction or dry fraction. For instance, the sweetener composition in the form of a liquid, in particular as preferably aqueous solution and/or dispersion, preferably as liquid sweetening, can have a solids fraction and/or dry fraction of 10 to 95% by weight, in particular 20 to 90% by weight, preferably 40 to 85% by weight, more preferably 50 to 80% by weight, particularly preferably 60 to 80% by weight, based on the sweetener composition.

Accordingly, the sweetener composition in the form of a liquid, in particular as defined above, can have a solvent fraction and/or dispersant fraction, preferably a water fraction, of 5 to 90% by weight, in particular 10 to 80% by weight, preferably 15 to 60% by weight, more preferably 20 to 50% by weight, particularly preferably 20 to 40% by weight, based on the sweetener composition.

As far as the amount of (a) dietary fiber or (b) sweetener is concerned in relation to the sweetener composition according to the invention in the form of a liquid, in particular as defined above, then in this respect, the amount of (a) dietary fiber can be 1 to 95% by weight, in particular 2 to 90% by weight, preferably 3 to 85% by weight, based on the sweetener composition, or the amount of (b) sweetener can be 0.01 to 85% by weight, in particular 0.05 to 80% by weight, preferably 0.1 to 70% by weight, particularly preferably 0.5 to 60% by weight, based on the sweetener composition.

The present invention—according to a second aspect of the present invention—further relates to the use of the sweetener composition according to the first aspect of the invention for sweetening foodstuffs, in particular drinks or other liquid to pasty foods or else solid foods.

For additional details in this respect on this aspect of the invention, reference can be made to the above explanations on the first aspect of the invention, which apply accordingly in respect of the use according to the invention.

Further designs, modifications and variations and also advantages of the present invention are readily recognizable and realizable for those skilled in the art on reading the description, without departing from the context of the present invention.

The present invention will be illustrated with reference to the exemplary embodiments hereinafter which do not, however, restrict the present invention.

Exemplary Embodiments

It is also true for the exemplary embodiments hereinafter that the individual components make up 100% by weight in total.

1. Example Formulas for Sweetener Compositions According to the Invention in the Form of Loose Sweetener:
   A sweetener composition according to the invention in the form of a loose sweetener is based on the composition cited hereinafter:
   80 to 99% by weight dietary fiber (dextrin having a fiber content of 50% by weight, based on the dietary fiber);
   3 to 10% by weight sweetener, in particular selected from aspartame, acesulfame, saccharine, cyclamate, stevioside and sucralose;
   1 to 10% by weight stabilizers (sorbic acid).
   The abovementioned weights relate to the sweetener composition according to the invention as such. The starting materials corresponding to the above-mentioned starting formula are first dissolved or dispersed in water. The solution has a dry matter fraction or a dry weight fraction of 60 to 70% by weight, based on the solution. Before the spray drying, the resultant solutions are heated for microbiological reasons. Thereafter, the solution treated in this manner is subjected to a spray drying under conditions known per se to those skilled in the art, in such a manner that corresponding granules result (median particle sizes of the granules, determined as $D_{50}$ value, are in the range of 0.05 to 4 mm, preferably 0.1 to 0.5 mm). The bulk densities of the relevant table sweetener or loose sweetener is set in the range of 50 to 300 g/l, preferably 80 to 100 g/l.

2. Preparation of Sweetening or Sweetener Tablets as Base Formula:
   For the sweetener composition according to the invention in the form of tablets, the following composition serves:
   30 to 80% by weight dietary fiber (dextrin having a fiber content of 50% by weight, based on the dietary fiber);
   30 to 50% by weight sweetener, in particular selected from aspartame, acesulfame, saccharine, cyclamate, stevioside and sucralose;
   optionally 1 to 10% by weight glidant (e.g. leucine);
   optionally 1 to 10% by weight disintegrant (for example in the form of an effervescent additive of tartaric acid/citric acid and sodium hydrogencarbonate);
   optionally 1 to 10% by weight stabilizers (e.g. in the form of sorbic acid.
   The abovementioned formula is compressed in the form of a mixture. The compression proceeds in this case starting from a dry mixture of the individual components to give a homogeneous mass which is then compressed on corresponding tablet presses to give the tablets according to the invention. This gives sweetening tablets or sweetener tablets having a mean particle diameter of about 5 mm and thicknesses of 1.8 to 2.8 mm. The tablets have a weight of 45 to 60 mg per tablet.

3. Production of a Liquid Sweetening According to the Invention:
   For production of a liquid according to the invention, the following composition is used:
   50 to 99% by weight dietary fiber (dextrin having a fiber content of 50% by weight, based on the dietary fiber);
   1 to 50% by weight sweetener, in particular selected from aspartame, acesulfame, saccharine, cyclamate, stevioside and sucralose;
   1 to 10% by weight stabilizer (sorbic acid).
   The above weight, relate to the sweetener composition according to the invention in the form of the liquid sweetening. Water is used as solvent. The substances or components are dissolved in water and then heated for microbiological reasons. This gives a liquid sweetening according to the invention which has a solids content of 60 to 80% by weight, based on the sweetener composition in the form of the liquid sweetening.

The invention claimed is:
1. A sweetener composition for sweetening foodstuffs, the sweetener composition having a reduced physiological calorific value and thus a reduced energy content, wherein the sweetener composition is in the form of grain-shaped granules and wherein the sweetener composition comprises, in combination, the following ingredients:
   (a) at least one water-soluble or water-dispersible dietary fiber selected from dextrins in an amount of 90-97% by weight, based on the sweetener composition, wherein (a) the dietary fiber comprises water-dispersible fibers in amounts of 40-60% by weight, based on (a) the dietary fiber, and wherein the dextrins of (a) the dietary fiber are poly- and oligosaccharide mixtures comprising at least one of 1,2-glycosidic bonds, 1,3-glycosidic bonds, 1,4-glycosidic bonds and 1,6-glycosidic bonds; and (b) at least one sweetener selected from the group of aspartame, acesulfame, saccharin, cyclamate, stevioside and sucralose and mixtures of the aforementioned sweeteners in an amount of 3 to 10% by weight, based on the sweetener composition;

wherein the weight ratio of (a) dietary fiber to (b) sweetener is between 30:1 and 5:1;

wherein the weight-related sweetening power of the sweetener composition corresponds to 1 to 70 times the sweetening power of sucrose;

wherein the physiological calorific value of the sweetener composition is in the range from 0.5 to 10 kcal/g;

wherein the sweetener composition has a total residual moisture of 2 to 4% by weight, based on the sweetener composition;

wherein the sweetener composition has a bulk density of 60 to 200 g/l, and wherein the granules have a particle size of 0.1 to 0.5 mm.

2. The sweetener composition as claimed in claim 1, wherein the sweetener composition additionally comprises (c) at least one sugar replacer in the form of at least one sugar alcohol selected from the group of erythritol, mannitol, xylitol, sorbitol, isomaltitol, maltitol, lactitol, galactitol and mixtures thereof, wherein the amount of (c) sugar replacer is 1 to 50% by weight, based on the sweetener composition.

3. The sweetener composition as claimed in claim 1, wherein the sweetener composition additionally contains (d) at least one sugar selected from mono- or disaccharides from the group of sucrose, mannose, maltose, dextrose, lactose, glucose, xylose, isomaltulose, trehalose and mixtures thereof, wherein the amount of (d) sugar is 1 to 30% by weight, based on the sweetener composition.

4. The sweetener composition as claimed in claim 1, wherein the sweetener composition additionally comprises (e) further ingredients and/or auxiliaries selected from flavorings or flavor substances, acidulants, dyes, vitamins, minerals, stabilizers and preservatives, fillers, pressing aids, disintegrants, lubricants and glidants, consistency-controlling agents, thickeners and mixtures thereof.

5. The sweetener composition as claimed in claim 1, wherein the weight-related sweetening power of the sweetener composition corresponds to 10 to 70 times the sweetening power of sucrose and wherein the physiological calorific value of the sweetener composition is in the range from 2 to 6 kcal/g.

6. A method for sweetening foodstuffs, wherein the method comprises the step of adding the sweetener composition for sweetening foodstuffs, the sweetener composition having a reduced physiological calorific value and thus a reduced energy content, wherein the sweetener composition is in the form of grain-shaped granules and wherein the sweetener composition comprises, in combination, the following ingredients:

(a) at least one water-soluble or water-dispersible dietary fiber selected from dextrins in an amount of 90-97% by weight, based on the sweetener composition, wherein (a) the dietary fiber comprises water-dispersible fibers in amounts of 40-60% by weight, based on (a) the dietary fiber, and wherein the dextrins of (a) the dietary fiber are poly- and oligosaccharide mixtures comprising at least one of 1,2-glycosidic bonds, 1,3-glycosidic bonds, 1,4-glycosidic bonds and 1,6-glycosidic bonds; and (b) at least one sweetener selected from the group of aspartame, acesulfame, saccharin, cyclamate, stevioside and sucralose and mixtures of the aforementioned sweeteners in an amount of 3 to 10% by weight, based on the sweetener composition;

wherein the weight ratio of (a) dietary fiber to (b) sweetener is between 30:1 and 5:1;

wherein the weight-related sweetening power of the sweetener composition corresponds to 1 to 70 times the sweetening power of sucrose;

wherein the physiological calorific value of the sweetener composition is in the range from 0.5 to 10 kcal/g;

wherein the sweetener composition has a total residual moisture of 2 to 4% by weight, based on the sweetener composition;

wherein the sweetener composition has a bulk density of 60 to 200 g/l; and wherein the granules have a particle size of 0.1 to 0.5 mm.

* * * * *